United States Patent [19]
Satoh et al.

[11] Patent Number: 4,964,094
[45] Date of Patent: Oct. 16, 1990

[54] OPTICAL DISK

[75] Inventors: Isao Satoh, Neyagawa; Makoto Ichinose, Sakai; Yoshihisa Fukushima, Osaka; Yuzuru Kuroki, Toyonaka; Yuji Takagi, Kadoma; Yasushi Azumatani, Neyagawa, all of Japan

[73] Assignee: Matsushita Electric Industrial Co., Ltd., Osaka, Japan

[21] Appl. No.: 217,308

[22] Filed: Jul. 11, 1988

[30] Foreign Application Priority Data

Jul. 15, 1987 [JP] Japan .................. 62-176173
Mar. 24, 1988 [JP] Japan .................. 63-70062

[51] Int. Cl.$^5$ ............................... G11B 7/00
[52] U.S. Cl. ................................... 369/59
[58] Field of Search ............... 369/59, 47–49; 360/48

[56] References Cited

U.S. PATENT DOCUMENTS 4,571,716 2/1986 Szerlip .
4,663,752 5/1987 Kakuse et al. .
4,748,611 5/1988 Tsuyoshi et al. .................. 369/59
4,800,549 1/1989 Yamagami et al. ............... 369/59

FOREIGN PATENT DOCUMENTS 20216704 1/1987 European Pat. Off. .

OTHER PUBLICATIONS

International Standard Organization Draft Proposal ISO/DP9171-2 (5th DP).

Primary Examiner—Vincent P. Canney
Attorney, Agent, or Firm—Stevens, Davis, Miller & Mosher

[57] ABSTRACT

The present invention relates to an optical disk having a control track. The control track is divided into sectors in a manner similarly to a data track to record data and comprises a plurality of sectors. Each sector is composed of a sector identifying portion ID in which address information is recorded and a control field portion CF in which control data is recorded. The control field portion CF has the same format as the sector identifying portion ID. The control data is divided into recording data units in the control field portion CF and recorded. An identification flag is provided for each of the sector identifying portion ID and control field portion CF. The control track is searched by the address information in the sector identifying portion ID. The address data and control data are selected by use of the identifying flags in the sector identifying portion ID and control field portion CF, and they are read, then the control data are reassembled in order by using the address data of the sector identifying portion ID.

10 Claims, 5 Drawing Sheets

OPTICAL DISK

BACKGROUND OF THE INVENTION

As control identification information of a conventional optical disk, a method of recording a control track onto a part of the optical disk has been known as disclosed in, e.g., ISO (International Standard Organization) Draft Proposal ISO/DP 9171-2 (5th DP), 1.7.2 Phase encoded part (PEP).

FIG. 5 shows a format of the control track in the conventional example. As shown in FIG. 5(a) data is repetitively recorded three times on one track. As shown in FIG. 5(b), each data comprises: data of 144 bits; a sector address of 8 bits; an error detection code (CRC) of 8 bits; a preamble (PR) of 16 bits to regenerate a clock; and a synchronization bit (SYNC) of 1 bit indicative of the head of the data. Each data bit is PE (Phase Encoding) modulated as shown in FIG. 5(c), by a suitable low frequency and recorded onto hundreds of tracks so as to be read at various rotational speeds.

When the optical disk is inserted into a drive, a head is moved by a linear motor and the control track is accessed, so that the control data is read out and various kinds of information which are peculiar to the disk such as recording system, recording and reproducing conditions, recording area, and the like are known. On the basis of this disk information, the operating mode of the drive is set. Due to this, various kinds of optical disks can be used by a single drive.

According to the foregoing structure, since no track address information is recorded on the control track, the control track cannot be directly sought. Therefore, the head is once moved to a position near the control track and either some of the hundreds of control tracks are roughly read without performing the tracking control. This causes the recording capacity of the disk to be reduced and a precise mechanism to accurately seek the control track is needed for the drive. In addition, since the optical head is moved to the control track portion without using any track address, the moving speed cannot be raised. Further, a waiting time of the rotation of the disk in a rough reading operation to seek the control track is caused. Therefore, when the disk is exchanged by the drive, it takes a time to read the control data from the control track and there is a problem in that the rise-up speed of the drive becomes slow.

SUMMARY OF THE INVENTION

In consideration of the foregoing points, it is an object of the invention to provide an optical disk in which control data of various kinds of optical disks can be promptly detected with a high reliability. Particularly, it is an object of the invention to provide an optical disk in which control data is promptly read by searching a control track at a high speed without using any additional mechanism and/or circuit, a driving apparatus can be actuated at a high speed, and a high extending capability of the apparatus can be obtained.

The control track of the optical disk according to the invention is divided into sectors in a manner similar to the data track to record data and comprises a plurality of sectors each including sector identifying portion ID in which address data is recorded and a control field portion CF in which control data is recorded. The control field portion CF has the same format as that of the sector identifying portion ID. The control data is divided into recording information units in the control field portion CF. Identification flags are respectively added to the sector identifying portion ID and control field portion CF and these portions are recorded onto a plurality of tracks. Similarly to the data track, the control track is sought by the address information in the sector identifying portion ID. The control data is selected by using the identification flags in the sector identifying portion ID and control field portion CF and it is read.

According to the present invention, the rise-up time of the driving apparatus can be remarkably reduced due to the reproduction of the control data with a high reliability and the high speed search of the control track, so that its practical effect is large.

DESCRIPTION OF THE PREFERRED EMBODIMENTS

Figure 1:
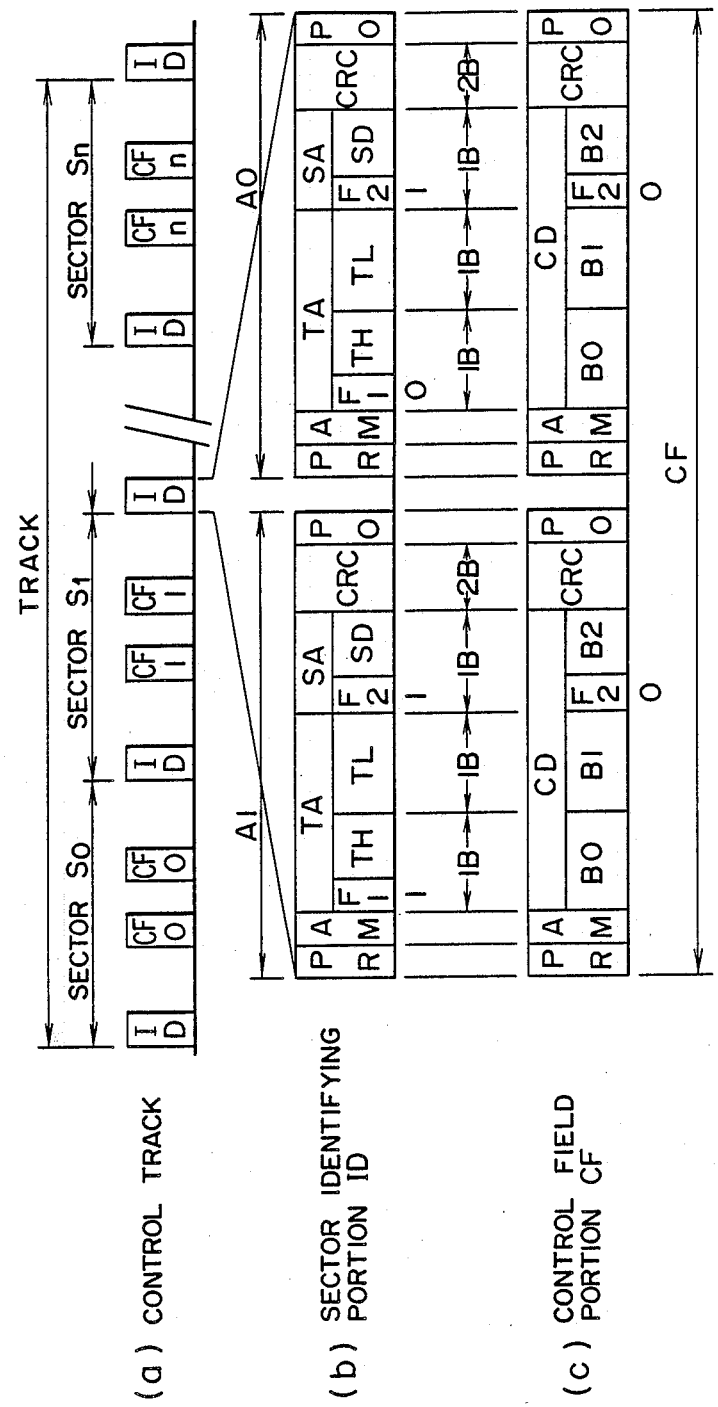
FIG. 1A through C is an arrangement diagram of a format of a control track on an optical disk in an embodiment of the present invention.

FIG. 1 is an arrangement diagram of a format of a control track on an optical disk in an embodiment of the present invention. The control track shown in FIG. 1, (a), comprises a sector identifying portion (ID) and a control field portion (CF) in which control data (CD) is recorded. Sectors $S_0, S_1, \ldots, S_n$ respectively have the control field portions $CF_1$ to $CF_n$ each of which was written twice. The sector identifying portion ID comprises addresses $A_0$ and $A_1$ which were written twice as shown in FIG. 2(a). These addresses are distinguished by 0/1 of an address identification flag ($F_2$) provided for the most significant bit of the higher byte TH of a track address (TA). Each of the addresses $A_0$ and $A_1$ comprises: a preamble (PR) to regenerate a clock; an address mark (AM) indicative of the head of data; address information (TA, SA); an error detection code (CRC); and a postamble (PO) to regenerate a clock.

$F_1$ denotes a flag to indicate the address $A_0$ or $A_1$.

The address information comprises the track address TA: a higher track address (TH) and a lower address (TL), and a sector address (SA). The sector address SA comprises sector address data (SD) and a CD/ID identification flag $F_2$. The flag $F_2$ is set to, for example, 0.

FIG. 1(c), shows a format of the control field portion CF. The fundamental structure of the control field portion CF is the same as that of the sector identifying portion ID and the address information corresponds to the control data. Namely, TA corresponds to bytes $B_0$ and $B_1$ and SD in SA corresponds to byte $B_2$. In the control field portion CF, the CD/ID identification flag $F_2$ is set to 1 which is opposite to the case of the sector identifying portion ID and is distinguished therefrom.

As mentioned above, if the control track is formatted in the same manner as the data track, the sector format of each control track becomes the same as the data track. Since the sector identifying portion ID of the control track is also read by a data track seeking circuit, the control track can be also sought in the same manner as the data track.

Further, if the control field portion CF is formatted in the same manner as the track format of the sector identifying portion ID, a sector identifying portion reproducing circuit can be commonly used to read the control data.

Figure 2:
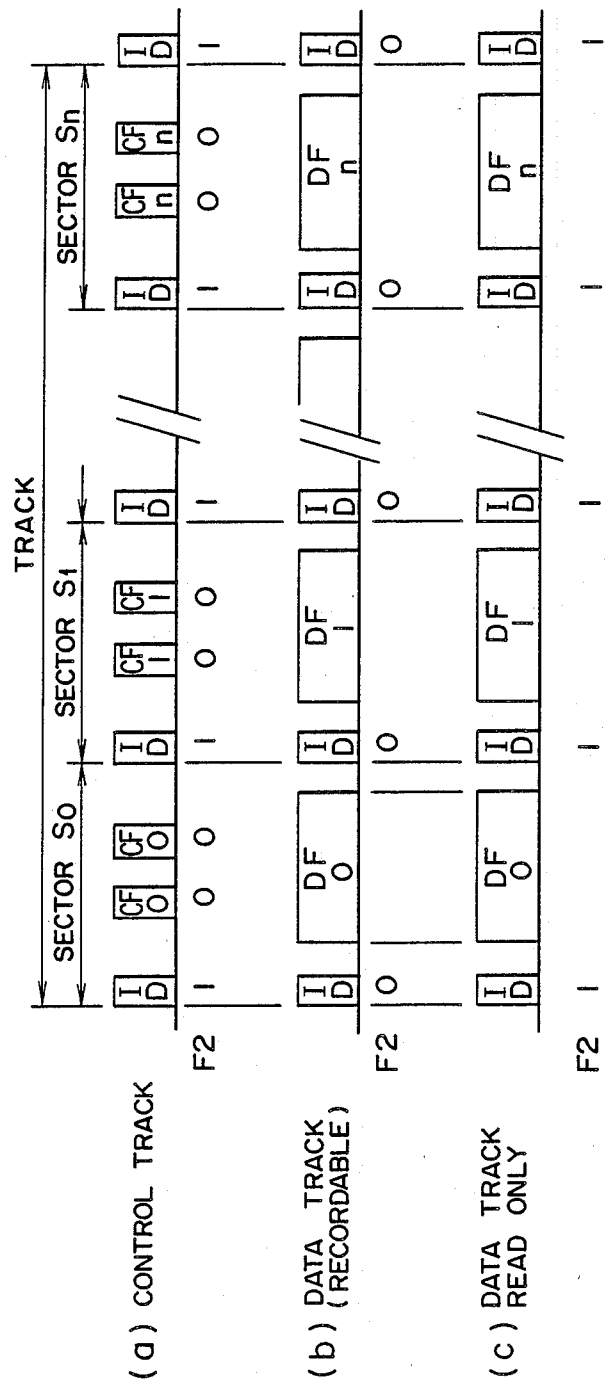
FIG. 2A through C is an arrangement diagram of identification flags and a track format.

FIG. 2 is an arrangement diagram of an embodiment of a track format on an optical disk of the invention. (a) in FIG. 2 shows an embodiment of the control track shown in FIG. 1(a). $F_2=1$ in the sector identifying portion ID. $F_2=0$ in the control field portion CF. The sector identifying portion ID and control field portion CF which are formatted in the same manner are recorded on the control track. Therefore, the driving apparatus can distinguish whether the readout data is the track address information or the control data by checking to see if the flag $F_2$ of the sector identifying portion ID and control field portion CF which were read out is set to "1" or "0".

FIG. 2(b) shows a format of a data track onto which data can be recorded. In this data track, since $F_2$ of the sector identifying portion ID is set to 0, it can be known that the relevant sector is the data track. Therefore, this data track can be distinguished from the control track ($F_2$ of the sector identifying portion is set to 1). An error correction code is added to the user's data and then this user's data is recorded into the data field portion (DF). On the other hand, as shown in FIG. 2(c), if it is constituted in a manner such that by setting $F_2$ of the sector identifying portion ID to 1 in the case of the read only data track, the data field portion DF indicates the read only area, the erroneous recording of data to the data field portion DF in the read only area can be prevented. Further, the switching and adjusting control of the gain of the focus servo or the like can be performed by detecting the difference between the reflectance of the signal track which was recorded as pits in the read only area on the optical disk and the reflectance of the continuous groove track onto which data is recorded. The system can be further stabilized.

The control data includes three bytes in each of the control field portions $CF_0$, $CF_1$, ..., $CF_n$ in FIG. 2(a) and is arranged in a manner such that the $CF_0$ is recorded in the sector 0, the $CF_1$ is recorded in the sector 1, the $CF_2$ is recorded in the sector 2, ..., and the $CF_n$ is recorded in the sector n in correspondence to the sector addresses SA in the sector identifying portion ID. The control data of total $3\times(n+1)$ bytes can be recorded.

On the other hand, for instance, assuming that 32 sectors are provided for each track, the $CF_0$ to $CF_{15}$ are recorded into the sectors 0 to 15 in the semicircle and the control data same as in the sectors 0 to 15 are repetitively recorded into the sectors 16 to 31 in the remaining half circle in a manner similar to the $CF_0$ to $CF_{15}$. In this manner, the control data of $3\times16=48$ bytes can be recorded by being interleaved among the sectors. Moreover, the control data which is little affected by defects of the disk has a high reliability and can be reproduced.

Figure 3:
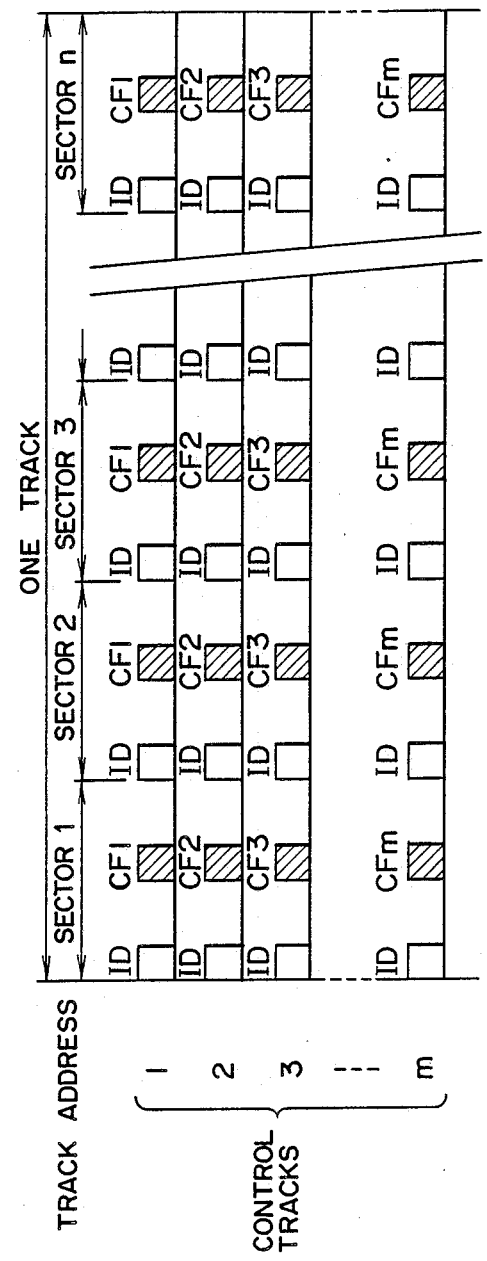
FIG. 3 is a sector arrangement diagram of control tracks on an optical disk in the second embodiment of the invention.

FIG. 3 is a sector arrangement diagram of control tracks on an optical disk in the second embodiment of the invention. The control tracks comprise m tracks of track addresses 1 to m and each track has n sectors. Each sector comprises the sector identifying portion ID in which the address information TA and SA were recorded and the control field portions $CF_1$, $CF_2$, $CF_3$, ..., $CF_m$ corresponding to the data field portion DF in the data recording sector.

The control field portion CF is constituted by the same format as that of the sector identifying portion ID. The control data divided on a 3-byte unit basis of the addresses in the sector identifying portion ID is recorded in the control field portion CF. The control data of the same three bytes are recorded in all of the sectors on the track of the same address in a manner such that the control field portion $CF_1$ is recorded onto the track 1, the control field portion $CF_2$ is recorded onto the track 2, ..., and the control field portion $CF_m$ is recorded onto the track m. All of the control data are recorded onto the m tracks while the 3-byte data are updated by the track addresses. That is, the control data is recorded into the sectors in a form such that it is divided into the control data of three bytes every control track. (Namely, the $CF_1$ is recorded into the sectors 1 to n on the track 1, the $CF_2$ is recorded into the sectors 1 to n on the track 2, ..., and the $CF_m$ is recorded into the sectors 1 to n on the track m). For example, if fifteen control tracks are used, the control data capacity is set to 45 bytes (=3 bytes $\times$15). As explained above, the control data are interleaved among the tracks and at the same time, the control data of the same three bytes are recorded in the sectors on each track. Therefore, the control data which is little affected by defects of the optical disk and has a high reliability can be read out.

When reading out of the control tracks, the head control track is first sought and the control field portion CF is read out in accordance with the order of $CF_1$, $CF_2$, $CF_3$, ..., $CF_m$ from the control field portion in either one of the sectors 1, 2, ..., n from the head control track, then, the adjacent track is sought. In accordance with this procedure, the control tracks can be sequentially read out.

Since the same control data unit is recorded in all of the sectors of each track, if the control field portion CF is read, the optical head can be quickly jumped to the next track and can access it. This is because, there is no sequence among the sectors of the control track, and the same control data unit is recorded in all of the sectors.

Consequently, there is no need to wait for the rotation of the optical disk. The control data can be successively read out every other sectors in such a manner that, for instance, the $CF_1$ in the sector $S_1$ is read out the track jump in the sector $S_2$ the $CF_2$ is read out in the sector $S_3$ the track jump in the sector $S_4$ ...

On the other hand, if either one of the n sectors is read out, the control data can be read out, so that the yield of the optical disk is good.

As described above, this embodiment is characterized in that for the control tracks, the same data is recorded in all of the sectors of one track, so that a fairly high reliability is obtained and the reading speed of the control data is higher.

In the first and second embodiments mentioned above, the CD/ID identification flag $F_2$ has been provided in the sector address SA. However, the flag $F_2$ can be also obviously provided for the idle bit in the track address in the case where eight bits are necessary for the sector address when the number of sectors is set to 128 or more in an optical disk of the MCAV (Modified Constant Linear Velocity) type in which the rotational speed of the optical disk is constant and which is formatted to a track group whose number of sectors per track is increased by a few sectors at a time from the inner rim to the outer rim of the disk, an optical disk having a large diameter, or the like.

If a frequency modulation (FM), PE (Phase Encoding) modulation, or the like in which clock bits are certainly included in the input data bits is used as a modulating system of the sector identifying portion ID, a regenerative clock for signal demodulation is directly obtained from the reproduction signal, so that the PLL (Phase Locked Loop) or the like does not need to be used. Therefore, even if the rotational speed of the disk varies in a wide range, data can be preferably reproduced. When comparing with the (2, 7) RLLC (Run Length Limited Code) modulation which is frequently used for the data field portion DF, the data recording density in the PE modulation is ½, so that the PE modulation is characterized in that the bit error rate is better by the amount of this small data recording density, the detection window is larger, data can be accurately reproduced at a data speed within a wide range by a small scale circuit.

Figure 4:
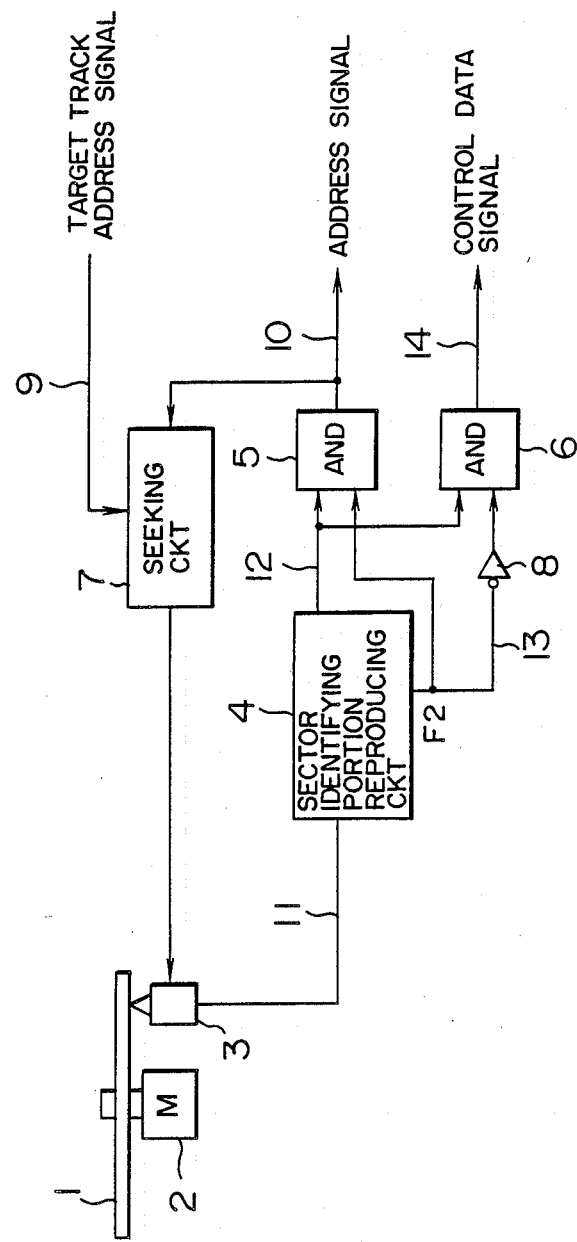
FIG. 4 is a block diagram of an embodiment of a drive to read address information and control data in a sector identifying portion from the optical disk of the invention.
Figure 5:
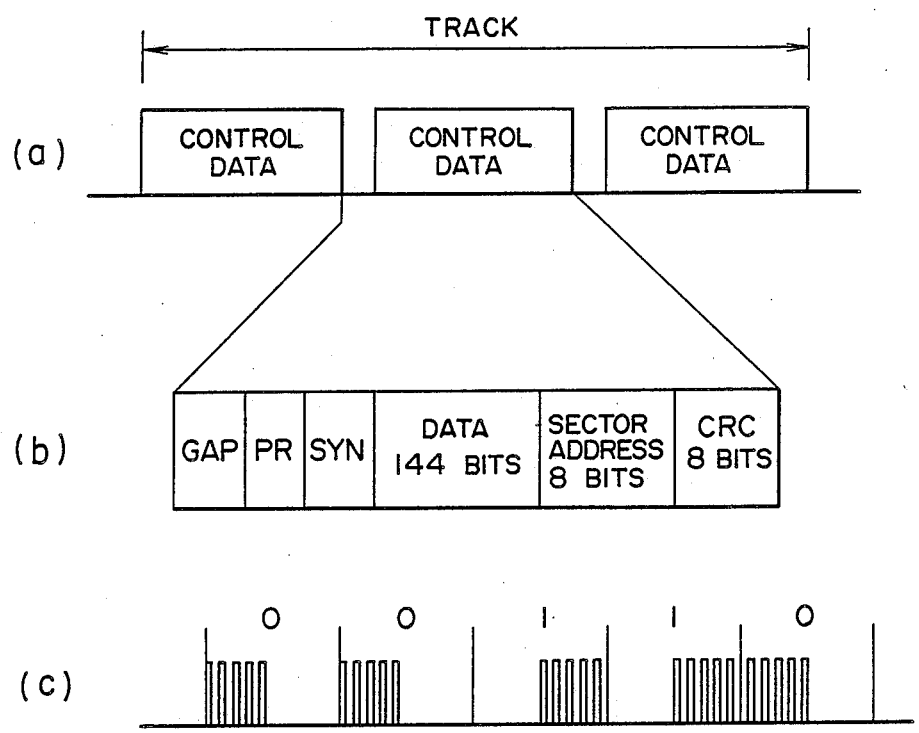
FIG. 5A through C is an arrangement diagram of a format of a control track in a conventional example.

FIG. 4 is a block diagram of a drive to read the address information in the sector identifying portion ID and the control data CD from an optical disk 1 according to the invention. The data recording and reproducing section and the servo system are omitted in the diagram. Reference numeral 1 denotes the optical disk; 2 is a motor M; 3 an optical head to record or read out data onto and from the optical disk 1; 4 a sector identifying portion reproducing circuit to read out address information of tracks and sectors from the sector identifying portion ID; 5 and 6 AND circuits; 7 a seeking circuit for performing seeking control to move the optical head 3 at a high speed by a linear motor and to seek a predetermined track on the optical disk 1; and 8 an inverter.

In the diagram, the drive applies to the seeking circuit 7 the address information of the control track to be sought as a target track address signal 9. The seeking circuit 7 compares an address signal 10 read by the sector identifying portion reproducing circuit 4 with the target address signal 9 and accesses the optical head 3 to an object track at a high speed.

A reproduction signal 11 of the optical head 3 is demodulated by the reproducing circuit 4 and a demodulation signal 12 is output. When the optical head 3 reads out the sector identifying portion ID, the demodulation signal 12 indicates the track address information (track address TA and sector address SA). On the other hand, when the optical head 3 reads out the control field portion CF, the demodulation signal 12 represents the control data CD.

The demodulation signal 12 is divided into an address signal 10 and a control data signal 14 by the AND circuits 5 and 6 on the basis of the sector address data SD and a flag $F_2$ signal 13 as the most significant bit of the control data byte $B_2$. That is, when the identification flag $F_2$ signal 13 is set to "1", the AND circuit 5 is made effective, so that the address signal 10 is output. When it is set to "0", the signal 13 is inverted by the inverter 8 and the AND circuit 6 is made effective, so that the control data signal 14 is output.

If the clock of the PE modulation or the like is provided for each bit of the sector identifying portion ID, the sector identifying portion reproducing circuit 4 can directly regenerate clocks from the reproduction signal 11 without using the PLL circuit as mentioned above.

Even if the rotational speed of the disk changes in a wide range, clocks can be preferably regenerated as compared with the case of regenerating clocks by the PLL circuit.

Therefore, the control track on the optical disk of the invention can be easily read by various kinds of driving apparatuses.

As will be obviously understood from the above description, the control track can be freely sought in the same manner as the data track by setting the control track so as to have the same sector format as that of the data track. Further, by setting the control field portion to the same format as that of the sector identifying portion, the sector identifying portion reproducing circuit can be commonly used to read the control data. In addition, when using the modulating system such that the modulation data bit has the clock bit, the address of the control track can be accurately read by various kinds of driving apparatuses and the control track can be directly sought. Thus, the control data can be promptly detected and the rise-up time of the drive when the disk is exchanged can be fairly reduced. On the other hand, since sufficient reliability is derived even when using the control tracks of the number within a range from a few tracks to ten or more, the reduction of the recording capacity is small.

As described above, according to the invention, a position seeking mechanism and a reading circuit of a special control track are unnecessary and the control data can be reproduced with a high reliability. Moreover, the rise-up time of the drive upon exchange of the disk can be remarkably reduced by directly seeking the control track and the like. As mentioned above, practical effects of the invention are large.

What is claimed is:

1. An optical disk comprising:
a plurality of data tracks each divided into a plurality of data track sectors, each of said data track sectors comprising (a) a sector identifying portion ID recording address data and (b) a data field portion DF for recording data, said section identifying portion ID comprising a sync clock portion PR, an address mark portion AM leading the address data, a track address portion TA, a sector address portion SA recording the address data, and an error detection portion CRC;
a plurality of control tracks recording control data for disk using/operating information representing sector physical formats and disk recording/reproducing information;
said control tracks being formatted similarly to said data tracks and divided into a plurality of control track sectors, each of said control track sectors comprising (a) a sector identifying portion ID and (b) a control field portion CF provided positionally corresponding to said data field portion DF and recording the control data, said sector identifying portion ID comprising a sync clock portion PR, an address mark portion AD, a track address portion TA, a sector address portion SA and an error detecting portion CRC; said control field portion CF being formatted similarly to said sector identifying portion ID and comprising a sync clock portion PR, an address mark portion MA, control data portions CD recording parts of said control data with locations corresponding to those of said track address portion TA and said sector address portion SA, and an error detecting portion CRC; said control field portion CF and said sector identifying portion ID further including respective identification flags to enable discrimination between them.

2. An optical disk according to claim 1, wherein said sector identifying portion ID is recorded by a modulating system which enables the recorded data bits to be used for self-clocking in a reproduction mode.

3. A disk according to claim 1, wherein each of said control tracks has control field portions CF recorded with respective control data segments $CD_0$, $CD_1$, $CD_2$ ..., $CD_n$ obtained by dividing control data in accordance with the number of sectors of said each track respectively.

4. A disk according to claim 3, wherein each sector of said control tracks comprises a sector identifying portion ID and a plurality of control field portions CF, and said sector identifying portion ID has several recording bits allocated to addresses of the respective track and sector.

5. An optical disk according to claim 4, wherein said identification flags are provided for idle bits of either track address information or sector address information of the sector identifying portion ID.

6. A disk according to claim 1, wherein each sector of said control tracks comprises a sector identifying portion ID and a plurality of control field portions CF, and said sector identifying portion ID has several recording bits allocated to addresses of the respective track and sector.

7. An optical disk according to claim 6, wherein said identification flags are provided for idle bits of either track address information or sector address information of the sector identifying portion ID.

8. An optical disk comprising:

a plurality of data tracks each divided into a plurality of sectors, each of which comprises a sector identifying portion ID recorded with a sector address and a data field portion DF for recording data; and a plurality of control tracks recorded with control data, said control tracks being formatted the same as said data tracks and comprising a plurality of sectors, each of which comprises a sector identifying portion ID and at least one control field portion CF corresponding to a data field portion DF of said data tracks and recorded with the control data, and said control field portion CF being recorded with the same format as a sector identifying portion ID, said control field portion CF and sector identifying portion ID including respective identification flags for discriminating between them, and wherein said plurality of control tracks comprise tracks $T_0$, $T_1$, $T_2$ ..., $T_n$ each having control field portions CF recorded with respective control data segments $CD_0$, $CD_1$, $CD_2$ ..., $CD_n$ obtained by dividing control data in correspondence with the number of addresses $T_0$, $T_1$, $T_2$ ..., $T_n$ of the tracks and by recording the segments $CD_0$, $CD_1$, $CD_2$ ..., $CD_n$ in all sectors of the respective tracks.

9. A disk according to claim 8, wherein each sector of said control tracks comprises a plurality of control field portions CF, and said sector identifying portion ID has several recording bits allocated to addresses of the respective track and sector.

10. An optical disk according to claim 9, wherein said identification flags are provided for idle bits of either track address information or sector address information of the sector identifying portion ID.

* * * * *